(12) United States Patent
Zoeller et al.

(10) Patent No.: US 12,398,304 B2
(45) Date of Patent: Aug. 26, 2025

(54) THERMALLY CONDUCTIVE POLYURETHANE ADHESIVE COMPOSITION

(71) Applicant: Henkel AG & Co. KGaA, Duesseldorf (DE)

(72) Inventors: Thomas Zoeller, Essen (DE); Nicole Schlingloff, Duesseldorf (DE); Eric Schmitz, Viersen (DE); Thomas Engels, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 110 days.

(21) Appl. No.: 17/804,623

(22) Filed: May 31, 2022

(65) Prior Publication Data
US 2022/0290020 A1    Sep. 15, 2022

Related U.S. Application Data

(63) Continuation of application No. PCT/EP2020/083843, filed on Nov. 30, 2020.

(30) Foreign Application Priority Data

Dec. 13, 2019  (EP) .................................. 19216133

(51) Int. Cl.
*C09J 175/08* (2006.01)
*C08G 18/10* (2006.01)
(Continued)

(52) U.S. Cl.
CPC ............ *C09J 175/08* (2013.01); *C08G 18/10* (2013.01); *C08G 18/4825* (2013.01);
(Continued)

(58) Field of Classification Search
CPC .......... C09J 175/08; C09J 5/04; C08G 18/10; C08G 18/4825; C08G 18/72; C08K 3/013
See application file for complete search history.

(56) References Cited

U.S. PATENT DOCUMENTS 5,077,117 A    12/1991   Harper et al.
6,649,012 B2   11/2003   Masayuki et al.
(Continued)

FOREIGN PATENT DOCUMENTS

CN    1055703 A      10/1991
CN    102115619 A    7/2011
(Continued)

OTHER PUBLICATIONS

Wondu et al., Thermal Conductivity and Mechanical Properties of Thermoplastic Polyurethane-/Silane-Modified Al2O3 Composite Fabricated via Melt Compounding, Polymers, vol. 11, No. 7, 2019, p. 1103, 12 pages.

(Continued)

*Primary Examiner* — Daniel McNally
(74) *Attorney, Agent, or Firm* — Sun Hee Lehmann

(57) ABSTRACT

The present invention relates to a thermally conductive polyurethane adhesive composition having excellent mechanical properties as well as improved performance after aging and a method of manufacturing the same. Further, the present invention relates to method of manufacturing an article comprising the thermally conductive polyurethane adhesive composition and articles obtainable by the described method.

20 Claims, 2 Drawing Sheets

(51) Int. Cl.
*C08G 18/48* (2006.01)
*C08G 18/72* (2006.01)
*C08K 3/013* (2018.01)
*C08K 9/06* (2006.01)
*C09J 5/04* (2006.01)
*C09J 11/04* (2006.01)
*C08K 3/22* (2006.01)

(52) U.S. Cl.
CPC .............. *C08G 18/72* (2013.01); *C08K 3/013* (2018.01); *C08K 9/06* (2013.01); *C09J 5/04* (2013.01); *C09J 11/04* (2013.01); *C08K 3/22* (2013.01); *C08K 2003/2227* (2013.01); *C08K 2201/001* (2013.01)

(56) References Cited

U.S. PATENT DOCUMENTS

| | | | |
|---|---|---|---|
| 8,192,583 | B2 | 6/2012 | Yazaki et al. |
| 8,399,595 | B2 | 3/2013 | Tribelhorn et al. |
| 9,637,668 | B2 | 5/2017 | Burckhardt et al. |
| 10,392,542 | B2 | 8/2019 | Schmatloch et al. |
| 11,292,947 | B2 | 4/2022 | Schlingloff et al. |
| 2015/0197680 | A1* | 7/2015 | Frank .............. C09K 5/14 252/75 |
| 2017/0369632 | A1 | 12/2017 | Pela et al. |

FOREIGN PATENT DOCUMENTS

| | | |
|---|---|---|
| CN | 102190881 A | 9/2011 |
| CN | 102627937 A | 8/2012 |
| CN | 102838719 A | 12/2012 |
| CN | 102876279 B * | 12/2013 |
| CN | 104789151 A | 7/2015 |
| CN | 105907348 A | 8/2016 |
| CN | 106978128 A | 7/2017 |
| CN | 107488251 A | 12/2017 |
| CN | 107513363 A | 12/2017 |
| CN | 107735475 A | 2/2018 |
| CN | 109679560 A | 4/2019 |
| DE | 19961973 A1 | 6/2001 |
| EP | 0453135 A1 | 10/1991 |
| EP | 2374929 A1 | 10/2011 |
| EP | 3310869 B1 | 5/2019 |
| JP | 2001172604 A | 6/2001 |
| JP | 2003171120 A | 6/2003 |
| JP | 2005015644 A | 1/2005 |
| JP | 2008127212 A | 6/2008 |
| JP | 2014111686 A | 6/2014 |
| JP | 2015214648 A | 12/2015 |
| JP | 5897184 B1 | 3/2016 |
| JP | 2016104832 A | 6/2016 |
| WO | 2008027561 A2 | 3/2008 |
| WO | 2018210568 A1 | 11/2018 |
| WO | 2019120924 A1 | 6/2019 |
| WO | 2019123336 A1 | 6/2019 |
| WO | 2019139057 A1 | 7/2019 |

OTHER PUBLICATIONS

International Search Report for International PCT Patent Application No. PCT/EP2020/083843 dated Feb. 19, 2021.
Progress in Polymer Science 38 (2013) 1232-1261.
Gao et al., Preparation of UV-Curable Waterborne Polyurethane Coating with Thermal Conductivity, School of Chemical and Material Engineering, Jiangnan University, Wuxi 214122, China, Published 2016.
Yang Zaijun et al., Development of polyurethane potting adhesive for electronic encapsulation, Technical Department of Shanghai Hansi Industrial Co., Ltd., Shanghai 201103, China; 2. Department of Macromolecular Science, Fudan University, Shanghai 200433, China, Published 2016.
Textbook of Polymer Science, Han Zhewen, et al., p. 374, East China University of Science and Technology Press Published Jul. 17, 2023.
Zhang Jikai et al., Organosilicon Materials, China Logistics Publishing House, 1st edition in Oct. 1999, pp. 361-362, Published 1999.

* cited by examiner

THERMALLY CONDUCTIVE POLYURETHANE ADHESIVE COMPOSITION

FIELD

The present invention relates to a thermally conductive polyurethane adhesive composition having excellent mechanical properties as well as improved performance after aging and a method of manufacturing the same. Further, the present invention relates to method of manufacturing an article comprising the thermally conductive polyurethane adhesive composition and articles obtainable by the described method.

BRIEF DESCRIPTION OF RELATED TECHNOLOGY

Adhesives which are thermally conductive are employed in several applications where a component must be fixed upon a structure and where heat has to be deflected from the component. Examples are electronic devices or applications in automotive industry and in particular bonding of batteries for power storage in e-mobility. For high thermal conductivity, high filling grades are needed which is usually an opposing feature to high tensile strength, high tensile elongation and acceptable viscosity of the uncured adhesives. For target applications a long lifetime and ensured reliability is mandatory. For power storage in electrical vehicles the modules are bonded to the cooling plates and need to ensure safe and reliable performance within a broad service temperature range.

However, when using thermally conductive but electrically isolating fillers such as aluminum oxide or aluminum hydroxide for high thermal conductivity, very high filler content is needed. These high filling grades strongly reduce the mechanical and rheological properties of the thermally conductive adhesives.

Attempts have been made to use surface-treated particles in polymer compositions.

For example, JP 2008127212 A discloses a surface treatment of aluminum oxide particles with phosphoric ester compounds as a polymerization initiator to graft polystyrene.

JP 2003171120 A discloses silane coupling agents used for the incorporation of aluminum hydroxide in artificial marble gaining flame retardancy and desired color tone.

CN 102115619 B discloses a method of surface-modifying aluminum oxide by a polyacrylic resin coating for using as high-performance filler in polyolefins.

WO 200827561 A1 discloses a method of silane surface treatment of aluminum oxide particles that allow for control of the tribocharge properties and humidity resistance of the metal oxide particle additives in toner for the use in polyester, polystyrene and polyacrylic resins.

Also, attempts have been made to develop polyurethane adhesives having increased adhesive strength and elongation.

WO 2018210568 A1 discloses a binder system comprising a special polyol mixture as a resin component, said polyol mixture comprising at least one polyester based on a fatty acid dimer, a fatty acid trimer or the alcohols derived therefrom, and at least one polyisocyanate as a resin component and/or a NCO-terminated polyurethane prepolymer, for the use as an adhesive/sealing material, in particular as an adhesive for gluing various substrates.

U.S. Pat. No. 8,399,595 B2 discloses a two part composition comprising an isocyanate functional group containing component, an isocyanate reactive component, one or more low molecular weight compounds having two or more isocyanate reactive groups and a molecular weight of 120 or less, one or more catalysts for the reaction of isocyanate functional groups with isocyanate reactive groups wherein the catalyst may be located in the isocyanate functional group containing component or the isocyanate reactive component.

U.S. Pat. No. 9,637,668 B2 discloses a two-component polyurethane adhesive having high strength and elasticity at a particularly low glass transition temperature, suitable as a structural adhesive. The adhesive contains a triol, a diol, a polyamine, a polyisocyanate and a polyurethane polymer having isocyanate groups in certain ratios, and a Fe(III) or Ti(IV) or Zr(IV) or Hf(IV) chelate-complex-catalyst.

It is therefore the object of the present invention to overcome the above-mentioned drawbacks by providing an adhesive composition which favorably combines the above-mentioned properties and which is suitable for use in electric powered vehicles.

SUMMARY

It was surprisingly found that the object of the invention can be solved by using a two-component polyurethane adhesive composition comprising surface-treated thermally conductive inorganic fillers having isocyanate-reactive groups on the surface.

A first object of the invention is therefore an adhesive composition comprising component A and component B, wherein the component A comprises:
A1) a polyol;
A2) a chain extender; and
A3) a surface-treated thermally conductive inorganic filler having isocyanate-reactive groups on the surface, and
wherein the component B comprises at least one isocyanate (NCO)-terminated compound.

DETAILED DESCRIPTION

Figure 1:
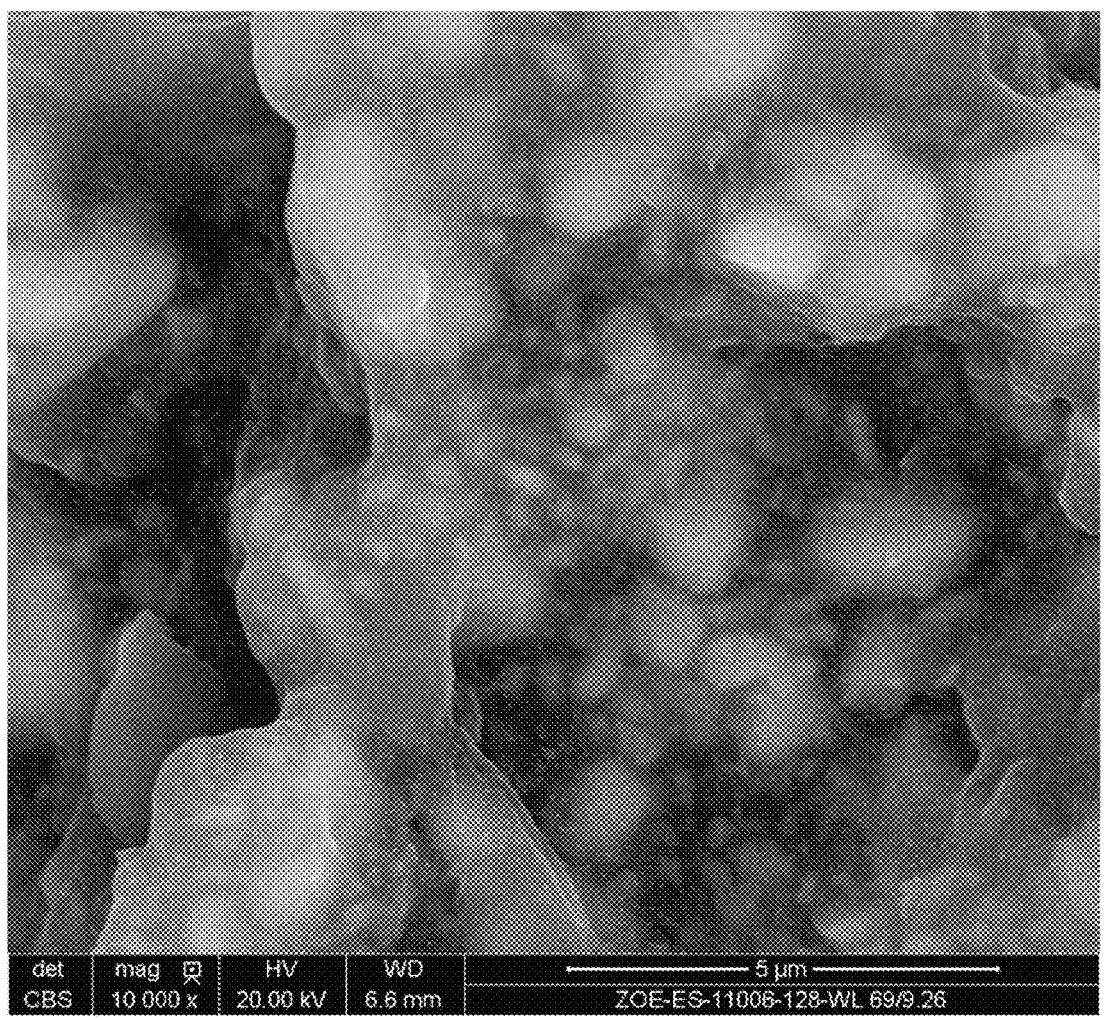
FIG. 1 is a scanning electron microscopy image showing the fractured surface of the cured adhesive product according to Example 1.

If reference is made herein to a molecular weight of a polymer, this reference refers to the average number weight $M_n$, unless stated otherwise. The number average molecular weight $M_n$ of a polymer can, for example, be determined by gel permeation chromatography (GPC) according to DIN 55674 with THF as the eluent. If not stated otherwise, all given molecular weights are those determined by GPC, calibrated with polystyrene standards. The average molecular weight Mw can also be determined by GPC, as described for $M_n$.

Component A

Component A of the inventive adhesive composition comprises A1) a polyol, A2) a chain extender and A3) a surface-treated thermally conductive inorganic filler having isocyanate-reactive groups on the surface.

Generally, there is no limitation to the molecular weight of the polyol used in the adhesive composition as long as it has no negative effect on the properties of the adhesive composition and the cured adhesive. In a preferred embodiment of the present invention, the polyol has a molecular weight $M_n$ of 700 to 12,000 g/mol, in particular 1,000 to 10,000 g/mol. Even more preferably, the polyol is a polyether polyol, preferably a polyether diol which preferably comprises primary hydroxyl groups or a mixture of primary and secondary hydroxyl groups. Examples of suitable polyether polyols are polyoxyalkylene polyols such as polyethylene glycol, polypropylene glycol, polytetramethyl glycol and polybutyl glycol. Also, homopolymers or copolymers of the listed polyoxyalkylene polyols as well as mixtures thereof are suitable for the purpose of the present invention. Particularly suitable copolymers are those comprising an adduct of a compound selected from the group consisting of ethylene glycol, propylene glycol, diethylene glycol, propylene glycol, triethylene glycol, 2-ethylhexandiol-1,3-glycerine, trimethylolpropane, trimethylolethane, tris(hydroxyphenyl)propane, triethanolamine and triisopropylamine with at least one compound selected from the group consisting of ethylene oxide, propylene oxide and butylene oxide.

Such polyols are well known in the art. Examples of the polyols suitable for the present invention are commercially available under the trade name Lupranol series from BASF, Acclaim series from Arcol and Desmophen series from Covestro.

In a preferred embodiment, the polyether polyol is an ethylene glycol end-capped polyethylene glycol/polypropylene glycol diol.

In a preferred embodiment of the invention, the polyether polyol is present in component A in an amount of at least 5 wt. %, preferably 10 wt. % to 35 wt. %, based on the total weight of component A. Within the amount range of polyol, the adhesive properties of the adhesive composition can be improved.

The present adhesive composition unexpectedly shows a desired combination of properties, in particular a high thermal conductivity at high volume resistivity in combination with excellent mechanical properties and improved lap shear strength after aging of bonded substrates. It was surprisingly found that this set of properties can be achieved by combining surface-treated thermally conductive inorganic fillers having isocyanate-reactive groups on the surface with polyols having specific molecular weights in the two-component polyurethane adhesive composition.

The surface-treated thermally conductive inorganic filler having isocyanate-reactive groups on the surface comprises the thermally conductive inorganic filler and isocyanate-reactive groups on the surface of the filler. In one embodiment, the thermally conductive inorganic filler is selected from the group consisting of metal oxides, metal hydroxides, metal silicates, metal sulfides and combinations thereof.

Examples of the suitable metal oxides to be used as the filler are the oxides of metals selected from the group consisting of tin, indium, antimony, aluminum, titanium, iron, magnesium, zinc, rare earth metals, alkaline metals, oxides of Mg, Ca, Sr and Ba, mixed metal oxides and mixtures thereof.

Examples of metal hydroxides to be used as the filler are the hydroxides of metals selected from the group consisting of tin, indium, antimony, aluminum, titanium, iron, magnesium, zinc, rare earth metals, alkaline metals, hydroxides of Mg, Ca, Sr and Ba, mixed metal hydroxides and mixtures thereof.

Examples of metal silicates to be used as the filler are the silicates of metals selected from the group consisting of tin, indium, antimony, aluminum, titanium, iron, magnesium, zinc, rare earth metals, alkaline metals, silicates of Mg, Ca, Sr and Ba, mixed metal silicates and mixtures thereof.

Examples of metal sulfides to be used as the filler are the sulfides of metals selected from the group consisting of tin, indium, antimony, aluminum, titanium, iron, magnesium, zinc, rare earth metals, alkaline metals, sulfides of Mg, Ca, Sr and Ba, mixed metal sulfides and mixtures thereof.

In a preferred example, the thermally conductive inorganic filler is selected from metal oxides, such as aluminum oxide, and metal silicates, such as aluminum silicate.

The surface-treated thermally conductive inorganic filler has isocyanate-reactive groups on the surface of filler. There is no limitation to the isocyanate-reactive groups on the surface of the thermally conductive inorganic filler. Preferably, the isocyanate-reactive groups are selected from the group consisting of hydroxyl, amino, carboxyl, thiol, epoxy group, and combination thereof. More preferably, the isocyanate-reactive group is a hydrolyzed residue of an aminoalkoxysilane or epoxidized alkoxysilane.

Examples of aminoalkoxysilane are 3-aminopropyltrimethoxysilane, 3-aminopropyltriethoxysilane, 3-aminobutyltriethoxysilane, N-methyl-3-amino-2-methylpropyltrimethoxysilane, N-ethyl-3-amino-2-methylpropydltrimethylsilane, N-ethyl-3-amino-2-methylpropyltrimethoxysilane, N-ethyl-3-amino-2-methylpropylmethyldimethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethylbutyldimethoxymethylsilane, N-ethyl-4-amino-3,3-dimethylbutyltrimethoxysilane, N-(cyclohexyl)-3-aminopropyltrimethoxysilane, N-(2-aminoethyl)-3-aminopropyltrimethoxysilane, N-(2-aminoethyl)-3-aminopropyltrimethoxysilane, N-(2-aminoethyl)-3-aminopropyltrimethyl-dimethoxysilane, aminopropyltriethoxysilane, bis-(3-trimethoxysilyl-2-methylpropyl)amine and N-(3'-trimethoxysilylpropyl)-3-amino-2-methylpropyltrimethoxysilane.

Examples of epoxidized alkoxysilane are glycidoxymethylmethyldimethoxysilane, glycidoxymethylmethyldimethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldimethoxyethoxysilane, γ-glycidoxypropylethyldimethoxysilane, γ-glycidoxypropylethyldiethoxysilane, γ-glycidoxypropylethyldipropoxysilane, γ-glycidoxypropylvinyldimethoxysilane, γ-glycidoxypropylvinyldiethoxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltrimethoxyethoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, (β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltrimethoxyethoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane.

The surface-treated thermally conductive inorganic filler having isocyanate-reactive groups on the surface of filler can be commercially available for example under the trade name of Silatherm and Silatherm Plus series from Quarzwerke, Martoxid series from Huber/Hpf Minerals, Aeroxide series from Evonik. Alternatively, the surface-treated thermally conductive inorganic filler can be prepared by the surface treatment of the thermally conductive inorganic filler with a coupling agent or surface treatment agent corresponding to the isocyanate-reactive groups, i.e. corresponding silane by using methods known to a person skilled in the art. For example, a surface-treated aluminum oxide filler having aminoethyltrimethoxysilyl groups on the filler surface can be prepared by surface treating the aluminum oxide filler with aminoethyltrimethoxysilane.

Not wishing to be bound by any theory, by incorporating the surface-treated thermally conductive inorganic filler having isocyanate-reactive groups on the surface of filler, the filler is capable to react with isocyanate-terminate compound and give the possibility to covalently bond to the polyurethane backbone, resulting in improved mechanical properties such as tensile strength.

By using the surface-treated thermally conductive inorganic filler, the thermally conductive polyurethane adhesive composition according to the present invention can achieve a lower filling grade of thermal conductive filler so as to improve the mechanical and rheological properties of the thermally conductive adhesives. According to the present invention, the surface-treated thermally conductive inorganic filler is present in component A in an amount of no more than 95 wt. %, preferably from 10 wt. % to 90 wt. %, and more preferably from 45 wt. % to 85 wt. %, in particular from 45 wt. % to 65 wt. %, based on the total weight of component A.

The thermal conductivity of the adhesive composition could be improved without substantially affecting the volume resistivity if the amount of filler was kept within the above ranges.

The component A of the adhesive composition further comprises a chain extender. Usually, chain extenders are low molecular weight molecules used to modify the backbone of a given polymer. Preferably, the chain extender has a molecular weight $M_n$ of 60 to 600 g/mol, and more preferably from 60 to 500 g/mol. In a preferred embodiment, the chain extender is a diol, in particular a linear or branched diol with 9 or less carbon atoms. In an especially preferred embodiment, the chain extender is selected from the group consisting of 1,2-propanediol, 1,3-propanediol, 2-methyl-1,3-propanediol, 1,4-butanediol, 1,5-pentanediol, 3-methyl-1,5-prentanediol, 1,6-hexanediol, 1,9-nonanediol, ethylene glycol, polyethylene glycol, propylene glycol, polypropylene glycol, neopentyl glycol, polybutylene glycol, cyclohexane-1,2-diol, cyclohexane-1,4-diol, 1,4-bis(hydroxymethyl)cyclohexane, and dimer diols (such as Pripol series from Croda) and mixtures thereof.

In a further preferred embodiment, the chain extender is present in component A in an amount of at least 0.1 wt. %, preferably in an amount of 2 to 8 wt. %, based on the total weight of component A. It was surprisingly found that the mechanical properties of the inventive adhesive composition could be adjusted as needed by varying the amount of chain extender in component A.

In a preferred embodiment, the polyol and the chain extender are present in component A in a weight ratio of 20:1 to 4:1, preferably 10:1 to 5:1.

Component B

Component B of the inventive adhesive composition comprises at least one isocyanate-terminated compound. In a preferred embodiment of the invention, component B comprises an aliphatic or aromatic NCO-terminated compound and preferably a mixture of aromatic (poly)isocyanates and/or (poly)isocyanate prepolymers.

In a preferred embodiment, the NCO-terminated compound is selected from the groups consisting of 1,5-Naphthylendiisocyanate (NDI), 2,4'- or 4,4'-Diphenylmethandiisocyanate (MDI), Isomers of Toluylendiisocyanates (TDI), Methylentriphenyltriisocyanate (MIT), hydrated MDI (H12MDI), Tetramethylxylylendiisocyanate (TMXDI), 1-Isocyanatomethyl-3-isocyanato-1,5,5-trimethylcyclohexane (IPDI), Xylylendiisocyanate (XDI), Hexan-1,6-diisocyanate (HDI), Pentamethylendiisocyanate, Dicyclohexylmethandiisocyanate as well as dimers, trimers, oligomers and polymers of the same.

Suitable (poly)isocyanate prepolymers are reactions products of compounds comprising OH groups and/or NH groups with an excess of polyisocyanates. Suitable prepolymers can for example be obtained by reacting a diol as described above with an excess of isocyanate as described above.

In a particular preferred embodiment, the NCO-terminated compound is a mixture of MDI isomers.

In a preferred embodiment, component B comprises at least 10 wt. %, more preferably at least 25 wt. % of the NCO-terminated compound, based on the total weight of component B. In an especially preferred embodiment, component B comprises 10 wt. % to 90 wt. %, in particular 25 wt. % to 40 wt. %, of the NCO-terminated compound.

The composition according to the invention may further comprise additives. These additives may be used to affect the properties of the composition, for example the mechanical properties and thermal conductivity. Preferably the one or more additives are selected from the group consisting of additional filler, pigments, rheology modifiers, drying agents, flame retardants, curing agents, surface active agents and anti-foaming agents.

In preferred embodiment the amount of the additives present in components A and/or B is from 0 to 95 wt. %, preferably 10 to 90 wt. %, and more preferably 15 to 75 wt. %, based on the total weight of the components A and/or B.

Apart from the thermal conductivity and the mechanical properties of the adhesive composition, other features have also to be taken into account, such as the processability. Especially the curability of the adhesive composition has to be adapted for the respective applications. It was surprisingly found that the mechanical properties of the inventive adhesive composition are advantageously balanced when the mixing ratio of component A to component B is within a certain range. Therefore, an embodiment of the present invention is preferred wherein the mixing ratio by weight of component A to component B is from 10:1 to 1:5, preferably 10:1 to 1:1,1, in particular 5:1 to 1:1.

In order to be processable in industrial application, the adhesive composition needs to have a viscosity that allows easy and precise application. Therefore, an embodiment is preferred wherein the adhesive composition according to the invention has a viscosity of no more than 10000 Pas, preferably no more than 1000 Pas, in particular 30 to 1000 Pas, determined using Brookfield RVDV-II+P, spindle RV T-F at 10 rpm at 20° C.

The inventive adhesive composition is thermally conductive. In a preferred embodiment, the adhesive composition exhibits a thermal conductivity of at least 0.8 W/mK, preferably 1.0 to 3.0 W/mK, determined according to ISO 22007-2 at 25° C. It was surprisingly found that an advantageously balance between thermal conductivity and adhesiveness can be achieved if the thermal conductivity of the adhesive composition is the adhesive composition especially suitable for use in the assemblies of energy storage devices.

A further object of the invention is cured adhesive product obtainable by curing the adhesive composition according to the invention. Curing of the inventive adhesive composition can be carried out by common methods well known to the person skilled in the art, such as treatment with radiation, for example UV light, exposure to moisture, induction and/or heating.

Commonly, the thermal conductivity of an adhesive composition is achieved at the costs of the adhesive and mechanical properties of the adhesive. It was surprisingly found that the inventive cured adhesive composition not only exhibits excellent thermal conductivity, but also possess advantageous mechanical properties.

The present cured adhesive product exhibits a tensile strength of at least 7.0 MPa, preferably 7.0 to 15 MPa, determined according to DIN EN ISO 527 at 23° C. It was surprisingly found that the cured composition showed a favorable cohesive strength when the values were chosen to lie within the claimed range.

In a further preferred embodiment of the present invention, the cured adhesive composition exhibits a tensile modulus of at least 40 MPa, determined according to DIN EN ISO 527 at 23° C. It was surprisingly found that the cured adhesive showed a flexibility that allows the absorbance of mechanical shocks without notably affecting the tensile strength if the tensile modulus was within the above range.

In yet a further preferred embodiment of the present invention, the cured adhesive composition exhibits a tensile elongation at break of at least 50% determined according to DIN EN ISO 527 at 23° C.

In yet a further preferred embodiment of the present invention, the cured adhesive composition exhibits a lap shear strength of at least 5.0 MPa, preferably 5.0 to 20 MPa, determined according to DIN EN 1465 with sandblasted aluminum substrates cleaned with isopropyl alcohol having 0.3 mm gap.

In yet a further preferred embodiment of the present invention, the cured adhesive composition exhibits a lap shear strength after alternating climate aging (from −30° C. to +90° C. in 20 cycles for 10 days) of at least 3.0 MPa, preferably 3.0 to 20 MPa, determined according to DIN EN 1465 with sandblasted aluminum substrates.

In a preferred embodiment, the cured adhesive composition exhibits a thermal conductivity of at least 0.8 W/mK, preferably 1.0 to 3.0 W/mK, determined according to ISO 22007-2 at 25° C.

The inventive adhesive composition is, in particular, suitable for use in the assembly of energy storage devices. It is therefore important that the cured adhesive composition does not show any significant electrical conductivity. In a preferred embodiment, the cured adhesive composition therefore possesses a high-volume resistivity, preferably more than $10^9$ Ωm, in particular more than $10^{10}$ Ωm, determined according to DIN EN 62631-3-1.

A further object of the present invention is a method for the manufacture of the inventive adhesive composition. The method according to the invention comprises the following steps:
a) providing the component A and component B; and
b) mixing components A and B to obtain the adhesive composition.

In a preferred embodiment, the method according to the invention comprises the following steps:
a) providing at least one polyol;
b) providing at least one chain extender;
c) providing a surface-treated thermally conductive inorganic filler having isocyanate-reactive groups on the surface;
d) optionally providing an additive,
e) mixing the provided components to obtain the component A;
f) providing the isocyanate-terminated compound and an optional additive as component B, and
f) mixing the component A with the component B to obtain the adhesive composition.

A further object of the present invention is a method of manufacturing an article using the adhesive composition according to the invention. The method according to the invention comprises the following steps:
i) applying the adhesive composition according to the invention onto the surface of a first substrate to be bonded;
ii) bringing the surface of the first substrate to be bonded, treated with the adhesive composition, into contact with a second substrate to be bonded; and
iii) curing the adhesive composition to obtain the desired article.

In a preferred embodiment, contacting of the first substrate to be bonded with the second substrate to be bonded is carried out by applying pressure.

The method according to the invention is especially suitable for the manufacture of temperature sensitive devices. In a preferred embodiment, the adhesive composition is therefore applied onto the surface of the first substrate at a temperature of 20 to 100° C., preferably 23 to 70° C.

A further object is an article obtainable according to method of manufacture according to the invention. Preferably, the article according to the invention comprises the cured adhesive composition according to the invention.

The adhesive composition according to the invention can be applied in a variety of technical fields and is especially suitable in the manufacture of heat sensitive objects, in particular objects where heat is generated. Accordingly, a further object of the present invention is the use of the inventive adhesive composition in pipes, preferably cooling coils; in electronic components, preferably light emitting devices, computer devices, mobile phones, tablets, touch screens, automotive technology, hifi systems, and audio systems; in joints between heat pipes and water tanks in solar heated heating; in fuel cell and wind turbines; in the manufacture of computer chips; in light devices; batteries; in housings; in coolers; heat exchanging devices; wires; cables; heating wires; household appliances such as refrigerators and dishwashers; air conditionings; accumulators; transformers; lasers; functional clothing; car seats; medical devices; fire protection; electric motors; planes and trains.

The invention will be illustrated in more detail by way of the following examples which are not to be understood as limiting the concept of the invention.

EXAMPLES

The following materials were used in the examples.

The polyol 4000 is a commercially available product of an ethylene glycol end-capped polyethylene glycol/polypropylene glycol diol having a $M_n$ of about 4000.

The chain extender is 3-methyl-1,5-pentanediol.

The non-surface treated aluminum oxide is commercially available under the trade name of Martoxid TM 1250 from Huber Martinswerk.

The alkysilane treated aluminum oxide is commercially available under the trade name of Martoxid TM 2250 from Huber Martinswerk.

The amino-silane treated aluminum oxide is commercially available under the trade name of Martoxid TM 4240 from Huber Martinswerk.

The non-surface treated aluminum silicate is commercially available under the trade name of Silatherm 1466-506 from Quarzwerke.

The epoxy silane treated aluminum silicate is commercially available under the trade name of Silatherm 1466-506 EST from Quarzwerke.

The catalyst is dioctyltindilaurate.

The other fillers including graphite, boron nitride, zeolith and hydrophobic fumed silica are all commercially available products.

Two-part polyurethane adhesive compositions were prepared as Examples (Ex.) and Comparative Examples (CEx.). Component A of the compositions were formulated according to the components and amounts in Table 1 by mixing well all components except the thermal conductive filler with a Speed mixer DAC400 (from FlackTek Inc.) until the mixture was dissolved completely, and then adding the thermal conductive filler into the mixture and mixing well to obtain Component A.

Component B of the compositions contains modified isocyanate based in 4,4'-MDI, 60 wt. % of the respective aluminum oxide or aluminum silicate used in component A, 3 wt. % graphite, 3 wt. % zeolith and 1 wt. % hydrophobic fumed silica. The component B was mixed well by using a Speed Mixer DAC400 (from FlackTek Inc.). Components A and B were mixed together in a weight ratio that provided an isocyanate index of 1.05 before being applied on substrate. NCO index is here defined as the ratio of the equivalent amount of isocyanate used relative to the theoretical equivalent amount required for a 1:1 reaction of NCO with NCO-reactive functionalities.

TABLE 1

Formulations of Component A of the adhesive compositions (in gram)

| | Ex. 1 | Ex. 2 | Ex. 3 | Ex. 4 | Ex. 5 | CEx. 1 | CEx. 2 | CEx. 3 |
|---|---|---|---|---|---|---|---|---|
| Polyol 4000 | 23.9 | 23.9 | 23.9 | 23.9 | 35.9 | 23.9 | 23.9 | 23.9 |
| Chain extender | 3.8 | 3.8 | 3.8 | 3.8 | 5.6 | 3.8 | 3.8 | 3.8 |
| Graphite | 2.0 | 2.0 | 2.0 | 2.0 | 3.0 | 2.0 | 2.0 | 2.0 |
| Boron nitride | 5.0 | 5.0 | 5.0 | 5.0 | 7.5 | 5.0 | 5.0 | 5.0 |
| Aluminum oxide, non-surface treated | — | — | — | — | — | 60.3 | — | — |
| Aluminum oxide, alkylsilane treated | — | — | — | — | — | — | 60.3 | — |
| Aluminum oxide, amino-silane treated | 60.3 | — | — | — | 40.2 | — | — | — |
| Aluminum silicate, non-surface treated | — | — | 30.15 | 15.1 | — | — | — | 60.3 |
| Aluminum silicate, epoxy silane treated | — | 60.3 | 30.15 | 45.2 | — | — | — | — |
| Catalyst | 0.01 | 0.01 | 0.01 | 0.01 | 0.01 | 0.01 | 0.01 | 0.01 |
| Hydrophobic fumed silica | 1.0 | 1.0 | 1.0 | 1.0 | 1.5 | 1.0 | 1.0 | 1.0 |
| Zeolith | 4.0 | 4.0 | 4.0 | 4.0 | 6.3 | 4.0 | 4.0 | 4.0 |

Performance Evaluation

The following properties in Tables 2 to 6 were determined for the adhesive product cured at 80° C., determined at 23° C., respectively.

TABLE 2

Testing results of mechanical strength and viscosity

| Item | Ex. 1 | Ex. 2 | Ex. 3 | Ex. 4 | Ex. 5 | CEx. 1 | CEx. 2 | CEx. 3 |
|---|---|---|---|---|---|---|---|---|
| Tensile modulus [MPa] | 57.0 | 53.0 | 61.0 | 52.0 | 41.4 | 51.0 | 42.0 | 56.0 |
| Tensile strength [MPa] | 9.9 | 7.1 | 8.5 | 7.9 | 8.6 | 8.2 | 6.1 | 8.3 |
| Tensile elongation [%] | 63 | 66 | 63 | 59 | 110 | 68 | 83 | 57 |
| Viscosity [Pas] | 345 | 844 | 835 | 766 | 289 | 232 | 222 | 835 |

TABLE 3

Testing results of thermal conductivity

| Item | Ex. 1 | Ex. 2 | Ex. 3 | Ex. 4 | Ex. 5 | CEx. 1 | CEx. 2 | CEx. 3 |
|---|---|---|---|---|---|---|---|---|
| Thermal conductivity [W/mK] | 1.76 | 1.96 | 1.98 | 1.98 | 1.56 | 1.71 | 1.72 | 2.04 |

TABLE 4

Testing results of volume resistivity

| Item | Ex. 1 | Ex. 2 | Ex. 3 | CEx. 1 | CEx. 3 |
|---|---|---|---|---|---|
| Volume resistivity [$10^{10}\Omega m$] | 4.3 | 4.2 | 3.1 | 1.4 | 3.8 |

TABLE 5

Testing results of lap shear strength

| Item | Ex. 1 | Ex. 2 | Ex. 3 | Ex. 4 | Ex. 5 | CEx. 1 | CEx. 3 |
|---|---|---|---|---|---|---|---|
| Lap shear strength [MPa] | 11.4 | 5.2 | 6.0 | 5.7 | 10.6 | 12.0 | 4.7 |
| Lap shear strength after aging [MPa] | 6.2 | 6.2 | 4.9 | 5.0 | 7.2 | 2.7 | 4.3 |

TABLE 6

Evaluation of predominant failure mode of filler-polymer interface of the broken tensile test specimen fracture surface by SEM images.

| Item | Ex. 1 | Ex. 2 | Ex. 3 | Ex. 4 | Ex. 5 | CEx. 1 | CEx. 2 | CEx. 3 |
|---|---|---|---|---|---|---|---|---|
| Failure mode | Cohesive | Cohesive | Cohesive | Cohesive | Cohesive | Adhesive | Adhesive | Adhesive |

As can be seen from Tables 2 to 6, the present invention achieved a good thermal conductivity in combination with excellent mechanical properties and good performance after aging. Specifically, all inventive examples having a lower filler content of the surface-treated aluminum oxide or aluminum silicate exhibited excellent performance in mechanical properties and thermal conductivity.

Nevertheless, Comparative Examples 1 and 3 having non-treated aluminum oxide or aluminum silicate showed lower lap shear strength and/or aged lap shear strength than the inventive examples. In addition, Comparative Example 2 containing alkylsilane treated aluminum oxide which has none-isocyanate-reactive groups on the filler surface exhibited a poorer tensile modulus and tensile strength than the inventive examples.

Figure 2:
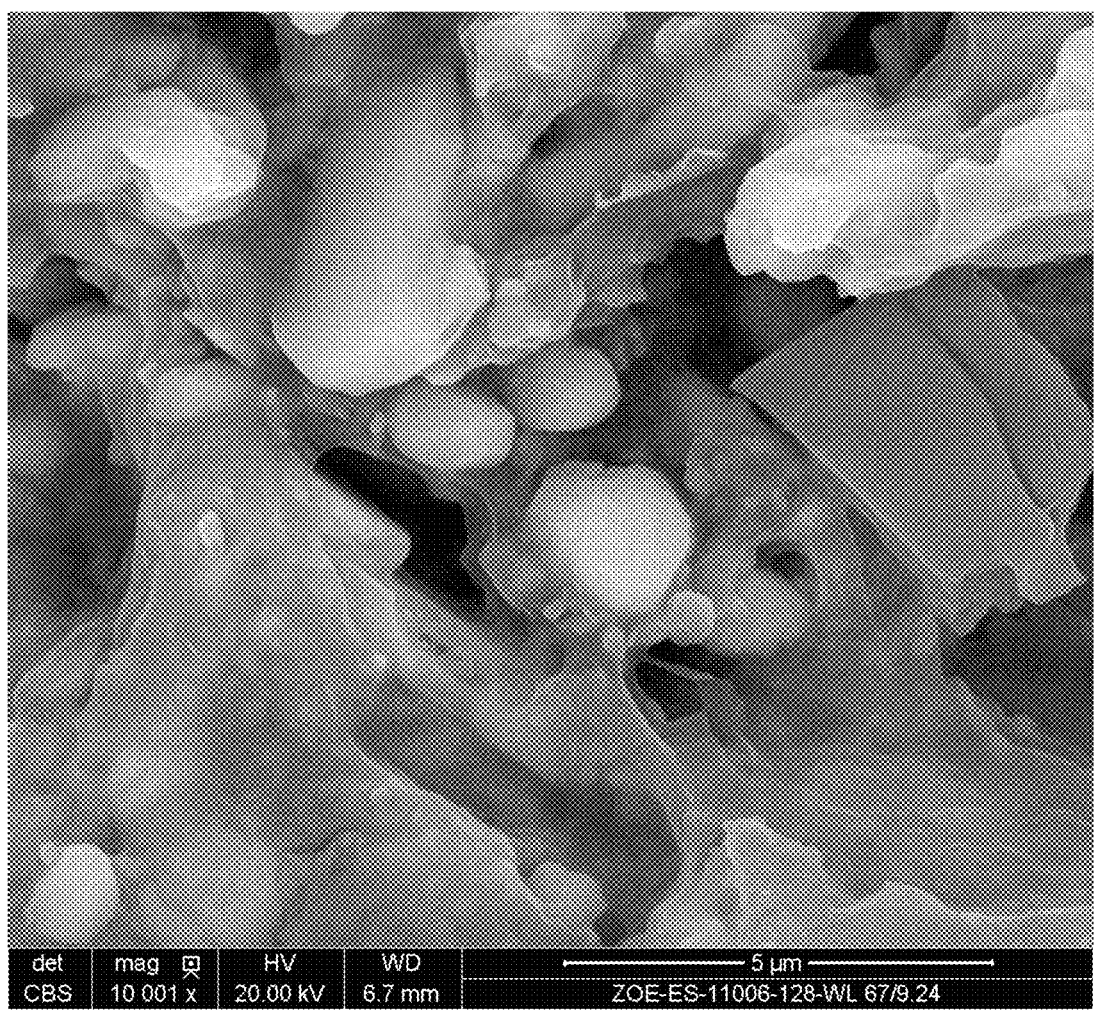
FIG. 2 is a scanning electron microscopy image showing the fractured surface of the cured adhesive product according to Comparative Example 1.

Further, the significant influence of the surface-treated thermally conductive inorganic filler having isocyanate-reactive groups on the surface contained in the adhesive compositions is further proven by SEM images of fracture surfaces of the filler-polymer interface for the broken tensile test specimen
as shown in FIGS. 1 and 2 and Table 6. In the inventive examples, the fracture patterns showed predominantly cohesive failure of the cured adhesive, while all comparative examples showed an adhesive failure occurred at the interface of the filler and the cured adhesive.

The invention claimed is:

1. A two-part composition comprising:
    a component A comprising:
        A1) a polyol;
        A2) a chain extender; and
        A3) a surface-treated thermally conductive inorganic filler with a surface having isocyanate-reactive groups; and
    a component B comprising an isocyanate-terminated compound,
        wherein an adhesive composition is obtained from a mixture of the component A and the component B.

2. The two-part composition according to claim 1, wherein the polyol is a polyether polyol.

3. The two-part composition according to claim 1, wherein the polyol has a molecular weight $M_n$ of from 700 to 12,000 g/mol.

4. The two-part composition according to claim 1, wherein the chain extender is a diol selected from the group consisting of 1,2-propanediol, 1,3-propanediol, 2-methyl-1,3-propanediol, 1,4-butanediol, 1,5-pentanediol, 3-methyl-1,5-prentanediol, 1,6-hexanediol, 1,9-nonanediol, ethylene glycol, polyethylene glycol, propylene glycol, polypropylene glycol, neopentyl glycol, polybutylene glycol, cyclohexane-1,2-diol, cyclohexane-1,4-diol, 1,4-bis(hydroxymethyl)cyclohexane, dimer diols, and mixtures thereof.

5. The two-part composition according to claim 1, wherein the chain extender has a molecular weight $M_n$ of from 60 to 600 g/mol.

6. The two-part composition according to claim 1, wherein the thermally conductive inorganic filler is selected from the group consisting of metal oxides, metal hydroxides, metal silicates, metal sulfides, and combinations thereof.

7. The two-part composition according to claim 1, wherein the thermally conductive inorganic filler is selected from the group consisting of aluminum oxide, aluminum hydroxide, aluminum silicate, and combinations thereof.

8. The two-part composition according to claim 1, wherein the isocyanate-reactive groups comprise an isocyanate-reactive group selected from the group consisting of hydroxyl, amino, carboxyl, thiol, epoxy group, and combinations thereof.

9. The two-part composition according to claim 1, wherein the isocyanate-reactive groups comprise an isocyanate-reactive group that is a hydrolyzed residue of an aminoalkoxysilyl compound or epoxidized alkoxysilyl compound.

10. The two-part composition according to claim 1, wherein:
    the isocyanate-reactive groups comprise an isocyanate-reactive group that is a hydrolyzed residue of an epoxidized alkylsilyl compound, the aminoalkylsilyl compound selected from the group consisting of γ-glycidoxypropyltrimethoxysilyl, γ-glycidoxypropyltriethoxysilyl, γ-glycidoxypropylmethyldimethoxysilyl, and γ-glycidoxypropylmethyldiethoxysilyl, or
    the isocyanate-reactive groups comprise an isocyanate-reactive group that is a hydrolyzed residue of an aminoalkylsilyl compound, the aminoalkylsilyl compound selected from the group consisting of aminoethyltrimethoxysilyl, aminoethyltriethoxysilyl, aminopropyltrimethoxysilyl, aminopropyltriethoxysilyl, aminopropylmethyldimethoxysilyl, aminopropylmethyldiethoxysilyl, aminoethyl-γ-aminopropyl-trimethoxysilyl, and iminobis(propyltrimethoxysilyl), or combinations thereof.

11. The two-part composition according to claim 1, wherein the isocyanate-terminated compound is an aliphatic or aromatic isocyanate-terminated compound.

12. The two-part composition according to claim 1, wherein the isocyanate-terminated compound is a mixture of aromatic (poly) isocyanates and/or aromatic (poly) isocyanate prepolymers.

13. The two-part composition according to claim 1, wherein the ratio by mass of components A and B is from 10:1 to 1:5.

14. The two-part composition according to claim 1, wherein the surface-treated thermally conductive inorganic filler is present in an amount of from 10 wt. % to 90 wt. %, based on the total weight of component A.

15. The two-part composition according to claim 1, wherein the polyol and the chain extender are present in the component A in a weight ratio of from 20:1 to 4:1.

16. The two-part composition according to claim 1, wherein the ratio by mass of components A and B is of from 5:1 to 1:1.

17. A cured adhesive product obtained by:
    mixing the component A and the component B of the two-part composition according to claim 1 to form an adhesive composition; and
    curing the adhesive composition.

18. The cured adhesive product according to claim 17, having a thermal conductivity of at least 0.8 W/mK, determined according to ISO 22007-2 at 25° C.

19. A method of manufacturing an article comprising:
    providing a first substrate having a bonding surface;
    providing a second substrate having a bonding surface;
    providing the component A and the component B of the two-part composition of claim 1;
    mixing the component A and the component B to obtain an adhesive composition;
    applying the adhesive composition onto the bonding surface of the first substrate; and
    bringing the bonding surface of the second substrate into contact with the adhesive composition on the bonding surface of the first substrate.

20. The method of manufacturing an article of claim 19, further comprising curing the mixed adhesive disposed between the bonding surface of the first substrate and the bonding surface of the second substrate.

\* \* \* \* \*